(12) United States Patent
De Feraudy et al.

(10) Patent No.: US 9,056,403 B2
(45) Date of Patent: Jun. 16, 2015

(54) SIMULTANEOUS PRECONCENTRATION AND PRESELECTION OF AT LEAST ONE GROUP OF UPGRADABLE POLYMER MATERIALS ORIGINATING FROM GRINDING WASTE OF DURABLE GOODS AT END OF LIFE

(75) Inventors: Hugues De Feraudy, Charantay (FR); Henri Seinera, Oullins (FR)

(73) Assignee: GALLOO PLASTICS, Halluin (FR)

( * ) Notice: Subject to any disclaimer, the term of this patent is extended or adjusted under 35 U.S.C. 154(b) by 51 days.

(21) Appl. No.: 13/811,087

(22) PCT Filed: Jul. 19, 2011

(86) PCT No.: PCT/FR2011/000422
§ 371 (c)(1),
(2), (4) Date: Mar. 29, 2013

(87) PCT Pub. No.: WO2012/017139
PCT Pub. Date: Feb. 9, 2012

(65) Prior Publication Data
US 2013/0181076 A1    Jul. 18, 2013

(30) Foreign Application Priority Data
Jul. 19, 2010   (FR) ..................................... 10 03023

(51) Int. Cl.
*B02C 23/00* (2006.01)
*B29B 17/02* (2006.01)
(Continued)

(52) U.S. Cl.
CPC ................. *B29B 17/02* (2013.01); *B02C 23/10* (2013.01); *B29B 2017/0203* (2013.01);
(Continued)

(58) Field of Classification Search
CPC ........ B02C 23/06; B02C 23/08; B02C 23/10; B02C 23/12; B02C 2023/156
USPC ...................................................... 241/20, 30
See application file for complete search history.

(56) References Cited

U.S. PATENT DOCUMENTS 6,024,226 A    2/2000  Olivier et al.
6,460,788 B1 * 10/2002  de Feraudy ..................... 241/19
(Continued)

FOREIGN PATENT DOCUMENTS

| EP | 1 534 487 A2 | 6/2005 |
| FR | 2 773 736 A1 | 7/1999 |
| FR | 2 860 994 A1 | 4/2005 |
| WO | 98/01276 A1 | 1/1998 |

(Continued)

OTHER PUBLICATIONS

International Search Report of PCT/FR2011/000422 Mailed Nov. 30, 2011.

*Primary Examiner* — Faye Francis
(74) *Attorney, Agent, or Firm* — Miles & Stockbridge P.C.

(57) ABSTRACT

The invention relates to a process for the simultaneous preconcentration and preselection of at least one group of used polymer materials of various compositions, as a mixture with one another and with contaminant materials, originating from the destruction, by grinding, of durable consumer goods that have reached the end of life, which can be recycled in the fields of plastics processing. This process is characterized in that it includes, in order, a) a step of separation in a hydraulic medium, the density of which is adjusted to a value ds between 1.100 and 1.900, b) a step of separation of the supernatant fraction from a), a step of grinding c) the supernatant fraction from b), then a step d) of mechanical separation of the fraction originating from c) followed by a wetting step e) and a final step f) delivering preconcentrated and preselected used synthetic polymer materials.

21 Claims, 1 Drawing Sheet

(51) Int. Cl.
 *B02C 23/10* (2006.01)
 *B02C 23/14* (2006.01)
 *B29B 17/04* (2006.01)
 *B29K 105/06* (2006.01)

(52) U.S. Cl.
 CPC  *B29B 2017/0224* (2013.01); *B29B 2017/0234* (2013.01); *B29B 2017/0244* (2013.01); *B29B 2017/0484* (2013.01); *B29K 2105/065* (2013.01); *B02C 23/14* (2013.01)

(56) References Cited

U.S. PATENT DOCUMENTS

2006/0118469 A1\*  6/2006  Bork et al. ............... 209/163
2007/0138064 A1\*  6/2007  Feraudy et al. .......... 209/163

FOREIGN PATENT DOCUMENTS

WO  98/03318 A1  1/1998
WO  2005/077630 A1  8/2005

\* cited by examiner

SIMULTANEOUS PRECONCENTRATION AND PRESELECTION OF AT LEAST ONE GROUP OF UPGRADABLE POLYMER MATERIALS ORIGINATING FROM GRINDING WASTE OF DURABLE GOODS AT END OF LIFE

CROSS REFERENCE TO RELATED APPLICATIONS

This application is a §371 National Stage Application of PCT/FR2011/000422, filed Jul. 19, 2011, which claims priority to France Application No. 1003023 filed Jul. 19, 2010.

BACKGROUND OF THE INVENTION

1. Field of the Invention

The invention concerns a method for the simultaneous preconcentration and preselection of at least one group of used polymer materials of various compositions, in a mix with each other and with contaminating materials, coming from the destruction by grinding of durable consumer goods that have arrived at the end of their life, able to be recycled in the fields of plastics technology.

2. Description of Related Art

An important problem is posed in the industries for recycling used polymer materials coming from the destruction by grinding of durable consumer goods at the end of their life, which is:

the low concentration of these upgradable used polymer materials in the flow of materials to be treated coming from the destructive grinding, where it is desirable to improve this concentration to make reprocessing thereof maximum, and their great diversity in nature and composition such as for example polyolefins, polyamides, polyvinyl chlorides and others, with or without fillers.

Industrial waste sorting equipment is technically specialised and suitable for the treatment of one particular type of waste such as for example upgradable used polymers, to be extracted from the grinding residues of durable consumer goods at end of their life, such as motor cars and domestic electrical equipment of other origins from which the metals have already been extracted in the main but which, in this other step, must be separated from contaminating materials in large quantities. This is why waste sorting equipment can be effective only provided that it is supplied with a flow of waste suited to it.

Equipment for sorting industrial waste such as used polymer materials, coming from the destruction by grinding of durable consumer goods at the end of their life, is not always (directly) installed on the site for the destruction by grinding of said goods and it consequently appears economically necessary to as far as possible enrich, with upgradable used materials, the waste to be transported from the destruction site to the reprocessing site.

In order to improve the reprocessing of waste and to make it maximum, it is necessary to feed the sorting equipment that is specialised for one type of waste with flows to be treated that are already preconcentrated with materials to be reprocessed.

This type of preconcentration of waste consequently has at least two objectives including the following:

one is to separate the waste in order to orient it to the specialised processing means, and the other is to preconcentrate a flow of waste to be treated loaded with upgradable materials in order to improve the overall efficiency of the waste processing chain by increasing the "mass of sorted products to be reprocessed compared with the total mass of products entering the waste processing chain" ratio.

However, it appears in the exploitation of this waste that preconcentration alone is insufficient in itself and that it is necessary simultaneously, during this preconcentration operation, to effect a preselection by grouping of the used polymer materials to be reprocessed in order to create specific flows of upgradable used materials accompanied by contaminating materials, not only with a much greater concentration of upgradable used polymers but also specific to the types of used polymers preselected by grouping making it possible both to simplify the equipment for reprocessing each type of polymer and to make it more economical and to recover almost all the polymers present in said waste while even further preserving the environment through a drastic reduction in the waste dumped.

SUMMARY

This is why the invention concerns a method for the simultaneous preconcentration and preselection of a fraction of synthetic polymer materials to be reprocessed from residues issuing from the destruction of durable goods that have arrived at the end of their life, these residues containing upgradable synthetic organic materials and other materials, some of which are also upgradable and the others constituting non-upgradable contaminating materials to be finally eliminated.

More particularly, the invention concerns a method for simultaneously extracting all the synthetic polymer materials in a solid or expanded state of any composition whatsoever, and to preselect, from all these polymer materials, at least one group of particular polymers present in a flow of residues containing other materials considered to be contaminating materials such as metals, minerals and other contaminants, in order to arrive at a concentration by weight of synthetic polymer materials in the simultaneously preselected group of at least 60%, preferably at least 85%, and very preferentially at least 90%. These simultaneously preconcentrated and preselected materials are intended to be subsequently subjected to another very fine separation and selection treatment for the purpose of recovering various fractions of homogeneous synthetic polymer materials, and also an extracted foam polymer fraction.

The flows to which the method of the invention applies generally come from automobile grinding residues and other durable consumer goods such as domestic electrical equipment and computer equipment that has arrived at the end of its life, for which a multiplicity of types of synthetic polymer materials are to be considered to be upgradable and for which a multiplicity of other materials are considered to be nuisance contaminants such as metals, minerals and various contaminating materials including in particular glass, wood, rubber and sand, and must be eliminated. Other waste, such as mixed industrial waste containing synthetic polymer materials and packaging waste coming from municipal collections and also containing mixed upgradable polymer materials may likewise be considered to be potentially upgradable.

DETAILED DESCRIPTION OF A PREFERRED EMBODIMENT

The important problem posed for recycling industries that has been known already for a few years has been the subject of a relatively large amount of industrial research, from which a few cases have been selected to establish the prior art in the field of the invention, but does not appear to have found a solution with regard to simultaneously achieving two important aims, which are preconcentration and preselection according to groups of upgradable used polymer materials mixed with each other and with contaminating materials in the waste coming from the destruction by grinding of durable consumer goods at the end of their life.

A first document (U.S. Pat. No. 6,024,226) describes a technology and method that make it possible to continuously separate and collect materials issuing from mixtures of heterogeneous solid particles coming essentially from solid waste using a plurality of separation cells, each cell being filled with a liquid of particular density and different from the other cells.

A first separation cell receives the flow of heterogeneous materials to be sorted, which is put in contact with a first support liquid with a density of approximately 1.0, enabling a first fraction of materials to be separated to float in the support liquid, forming a light fraction, whereas the remaining fraction with a higher density flows, forming a heavy fraction. This heavy fraction is taken up and introduced into a second separation cell, the support liquid medium of which has a density different from that of the first cell, thereby giving rise to a new separation into light fractions and heavy fractions.

The method thus evoked appears to be especially suited to the treatment of metal fractions with a view to recovering the non-ferrous metals, and to the treatment of synthetic organic fractions possibly purified with regard to their heavy synthetic organic material content—essentially chlorinated materials—for less polluting thermal reprocessing.

Another document (WO 98/01276) describes a method and device for treating waste consisting of mixed synthetic polymer materials. The particles that exceed a particular weight or a particular density (described as a heavy fraction) are separated prior to the lighter waste such as films and papers, which are aspirated and managed differently. According to this patent, the heavy fraction of rigid thermoplastic polymers in a mixture is ground in two types of grinder, and then sieved at fine dimensions of a few millimetres, and then separated by screening and sorted by means such as suction and/or separation by electrostatic charges. To this end, the processing device comprises a grinding step, a screening step and/or an electrostatic separation step. The relevant flows of materials to be treated are essentially more or less contaminated plastic packaging waste, where it is a case of extracting a fraction with a view to thermal reprocessing. The fine grinding and sieving reduce the chlorinated and inorganic materials content.

The patent EP 1 534 487 describes a method of pre-concentrating upgradable polymer materials issuing from a grinding residue of consumable articles at the end of their life, such as motor cars, computer equipment, domestic electrical equipment or the like, which consist of treating the residue by successive steps comprising screening, aeraulic separation, grinding and final aeraulic separation, in order to eliminate therefrom most of the contaminating materials such as metals, glass, rubber, sand or the like and to obtain a preconcentrated fraction of polymer materials that can be upgraded by recycling.

However, this preconcentration method is limited solely to this function of increasing the proportion of upgradable used polymer materials of various natures and various compositions in a flow of waste by partial elimination of various contaminants present in order to reduce for example the volumes transported and to facilitate the final sorting during the operations of selective separation for upgrading.

Consequently the flow resulting from this method, formed mainly by upgradable used polymer materials in a mixture with contaminating materials in a small proportion supplies an upgrading method made complex since not only must this method eliminate all the remaining contaminating materials but it must also separate each type of polymer, according to its family of origin, depending on whether it contains fillers or not, according to its physical state of dense material or material in the form of foam, that is to say its shape factor and according to still many other criteria.

Thus the prior art may propose at least one method for enrichment with upgradable used polymer materials from a flow of waste with extremely diverse compositions containing said polymers, which is limited solely to this preconcentration, which delivers a flow of waste with a very low proportion of contaminating materials and a very high proportion of upgradable used polymers but without there being, during this preconcentration, a grouping together of these used polymers according to appropriate criteria, that is to say there is an initiation of selection between these various used polymers to be upgraded.

Numerous objectives are consequently assigned to the subject matter of the invention, so that at least most of the drawbacks perceptible in the prior art are eliminated and the problem observed is solved.

A first aim of the invention is to create a method and its corresponding industrial installation for simultaneously effecting a preconcentration and a preselection of upgradable synthetic polymer materials of all types present in the complex flow of materials issuing from the grinding of durable consumer goods at the end of their life, such as motor vehicles, domestic electric equipment and electrical and/or electronic articles after a first coarse treatment, through the separation thereof from the other contaminating materials such as expanded polymer materials, metal materials, mineral materials such as for example sand and glass, and natural organic materials such as wood for example.

Another aim of the invention is to create a method and a corresponding industrial installation for producing, from the complex flow formed from waste issuing from the grinding of durable consumer goods, as mentioned previously, a preconcentration solely of the upgradable polymer materials of a compact nature, that is to say free from expanded polymer materials with open or closed cells, wherein the concentration of upgradable compact polymer materials at the end of the treatment by the method is raised to at least 60% by weight and preferentially to at least 80% by weight, this preconcentration being able to be subsequently treated effectively in installations or by appropriate selection technologies in order to extract therefrom homogeneous polymer materials having degrees of purity close to raw polymer materials, and this for each family of polymer materials present in said flow.

Another aim of the invention is to create a method and a corresponding industrial installation that simultaneously effects:
  a preconcentration solely of the upgradable polymer materials of a compact nature present in the complex flow of materials issuing from the grinding of durable consumer goods at the end of their life, and
  a preselection of these upgradable used polymer materials by using grouping criteria based on minimum and maximum density ranges delimiting each created group of upgradable used polymers.

According to the various aims of the invention previously stated, the method for treating a mixture of fragmented materials composed of upgradable used polymer materials in small quantities and contaminating materials issuing from the grinding of durable consumer goods at the end of their life, such as motor vehicles, domestic electrical equipment, electronic equipment and the like reduces the drawbacks manifested during the examination of the prior art and affords substantial improvements in the means of the prior art and solutions to the industrial problems posed.

According to the invention, the treatment method consisting simultaneously of:

the preconcentration of a mixture of used polymer materials that can be recycled in the fields of plastics technology by the partial elimination of the contaminating materials present in the mixture, and the preselection in the mixture of at least one group of upgradable used polymer materials delimited by a density range $[d_{min}-d_{max}]$ situated within a density range delimited by the bounds [0.850-1.900] of the mixture of fragment materials issuing from the residue from grinding durable consumer goods at the end of their life, comprising:

a fraction of upgradable materials that are synthetic polymer materials, with various natures and/or compositions and/or shape factors, the densities of which are situated in the range [0.850-1.900], fractions of contaminating materials to be eliminated from mineral materials and/or metal materials and/or organic materials other than polymer materials and/or synthetic polymer materials in an expanded state, in particular foams, is characterised in that it comprises, in the following order:

a) a step of separation in a water medium the density of which is adjusted to a value $d_s$ chosen in a density range, lower bound excluded defined by [1.100-1.900], $d_s$ constituting the upper density limit "$d_{max}$" chosen for a group of upgradable used polymers to be preselected, whereas the lower density limit $d_{min}$ of said group lies in the range $[0.850-d_s]$, a water medium in which the mixture of used polymer materials to be upgraded and contaminating materials is introduced, which is separated into a supernatant fraction (a1) of maximum density $d_s$ and a settling fraction (a2), containing used polymer materials to be upgraded forming a group of upgradable used polymers with densities greater than $d_s$ preconcentrated and preselected and at least partly the fraction of contaminating materials of the mixture of fragmented materials, extracted from the method, b) a step of separating the supernatant fraction (a1) coming from step a) in a water medium the density of which is adjusted to a value of 1.100 giving a supernatant fraction (b1) with a density of no more than 1.100, which consists of a fraction of ultra-light and/or expanded used synthetic polymer materials and used synthetic materials to be upgraded in a fragmented form as well as contaminating materials and a settling fraction (b2) with a density lying in the range $[1.100-d_s]$ containing upgradable used polymer materials and heavy contaminating materials, constituting another group of preconcentrated and preselected upgradable used polymers, extracted from the method to be upgraded, c) a step of grinding the fraction (b1) of polymer materials to be upgraded coming from step b), at the mesh releasing the contaminating materials, included in, adhering to or assembled with the fragments of the fraction of polymer materials to be upgraded, d) a step of mechanical separation by a dimensional screening and/or by shape factor or aeraulic, of the fraction of synthetic polymer materials to be upgraded coming from the grinding step c) in order to eliminate therefrom at least partly the fraction (d2) of contaminating materials released during the grinding and the expanded polymer materials and extract therefrom the fraction (d1) of the upgradable materials constituting the required mixture, preconcentrated and preselected according to a group of upgradable materials, delimited by the densities $d_{min}$=0.850 (lower bound excluded) and $d_{max}$=1.100 still containing contaminants, e) a step of wetting the fraction coming from step d) by means of water with a view to increasing the density of the "wood" contaminant present, f) a step of separating the fraction coming from step e) in a water medium the density of which is adjusted to the value 1.100, giving a supernatant fraction (f1) of used synthetic polymer materials to be upgraded, forming a preconcentrated and preselected group of upgradable used synthetic polymer materials delimited by the densities $d_{min}$=0.850 (lower bound excluded) and $d_{max}$=1.100 constituting a raw material for a method of fine separation of the polymers present according to their composition with a view to recycling thereof and a settling fraction (f2) containing mainly the "wood" contaminant.

In order to be in a position to perceive the whole scope of the method according to the invention, it is important to define the mixtures of materials to be upgraded (containing contaminating materials to be at least partially eliminated) constituting the flow of materials entering the method of the invention which, at the end of said method, gives the fraction of upgradable materials forming a preconcentrated mixture at at least 60% and preferentially at least 85% of upgradable materials preselected according to groups the density limits of which are in the first case [0.850-1.100], for the second $[1.100-d_s]$ and for the third at least $[d_s-1.900]$, it being understood that between $d_s$ and 1.900 other groups may be formed. Thus the method according to the invention of processing a mixture of materials to be upgraded in a fragmented form, for obtaining a mixture of preconcentrated and preselected materials consisting of synthetic polymer materials to be upgraded, thermoplastic and/or thermosetting, is supplied from two flows "I" and "II", residues of automobile grinding and durable consumer goods such as those in the field of domestic electrical equipment and/or electronics that have arrived at the end of their life. These grinding residues have their largest dimension at no more than 250 mm and preferentially no more than 200 mm.

The flows "I" and "II" can be implemented separately or in a mixture according to the way in which the grinder operator is working, by campaign or not. The flow "I" is the fraction that is called in the trade "non-aspirated heavies", at the discharge from the grinder for automobiles and durable consumer goods, separated or not from the metals, the flow "II" being the aspirated light flow known by term "fluffs" at the discharge from said grinder. The free metal fragments may be separated from the non-metal parts by conventional magnetic techniques and by eddy current.

The flow "I" or "heavies" flow comprises non-aspirated rubbers and thermoplastic and thermosetting polymers, the rest of the metals, the inorganic materials, wood, etc., which have passed through a separation grid having a mesh of 20 to 250 mm, preferably 20 to 200 and very preferentially 100 to 150 mm of the primary grinder, in the case of the grinding of automobiles and durable consumer goods.

The flow "II" or "light" or "fluff" flow, consisting of thermoplastic and thermosetting materials, is in the form of dimensional heterogeneous plates, pieces of foam and/or sheets, fabrics adhering to substrates, threads or film waste.

Some grinders for vehicles and/or durable consumer goods operate under water spray in order to prevent risks of explosion and formation of dust, which are additional risks for the environment. Thus the grinding residues do not have the same moisture content from one batch to another depending on the quantities of open-cell foams, fibres and fabrics.

In particular when open-cell flexible foams, which are essentially polyurethane foams (coming from car seats), are soaked in water, it is preferably to treat them by means of suitable methods that take account of their different characteristics and more precisely their apparent density, and in separating them it appears necessary to use their shape factor.

On the other hand, when the residues are in a dry state, a first light aspiration may be particularly advantageous for extracting these same open-cell flexible foams.

The metals can be recovered at each step of the method of pre-concentrating the fraction of synthetic organic materials, by known means such as magnetic separation and separation by eddy current.

The method of preconcentration and preselection by group of densities of the fractions of upgradable materials that are synthetic polymers adapts to any system for grinding vehicles and/or durable consumer goods already in place, whatever the grinding technique for the destruction of these goods at the end of their life.

The method, technologies, equipment and preconcentration and preselection installations relating thereto are preferentially positioned on the site of the large automobile grinder, in the case of the treatment of automobile grinding residues.

To afford a good understanding of the various upgradable materials and contaminants constituting the mixture of materials to be subjected to the preconcentration method according to the invention, resulting from a destructive grinding of consumer goods at the end of their life, such as motor vehicles, for example, these various materials are specified in the following definitions The Heavy Materials and the Light Materials: the heavy materials constitute the heaviest fraction, issuing from a step of separation by real density or apparent density, in the method according to the invention, of the flow of material being treated, in contradistinction to the light materials constituting the light fraction of the said flow.

It should be noted that at least some of the heavy materials of a separation step may become the light materials of the subsequent separation step, and vice versa: some of the light materials of a step may be considered to be heavy materials in a subsequent separation step.

The ultra-light materials: the first light fraction of the flow of material being processed, separated by density or apparent density, is called the ultra-light fraction. This ultra-light fraction is in particular composed of foam, textiles, films or pieces of thread, these materials preferentially in a dry state having a density that increases according to the moisture level.

The ultra-heavy materials: the first heavy fraction of the flow of material being processed, separated by density or apparent density, is called the ultra-heavy fraction. This ultra-heavy fraction is in particular composed of sand, metals, rubber or wood.

The synthetic polymer materials: corresponding to the part of the flow of material being processed composed of thermoplastic and thermosetting polymers to be upgraded, which can be extracted from the grinding residues and reused or recycled.

The fraction of organic materials other than polymers to be upgraded is mainly composed of wood, organic textile waste, thread waste or the like.

The fraction of foam polymer materials is essentially formed by open-cell foams as well alveolar foams with closed cells such as polyurethane foams, elastomeric polymer materials or those that have not been the subject of a pore-producing action in the mass.

The fraction of contaminating materials is formed by metal waste or particles, pieces of rubber, glass, gravel, sand, wood, polymer foam waste, films, filaments or fabrics made from synthetic polymer materials or other waste that must be eliminated.

Figure 1:
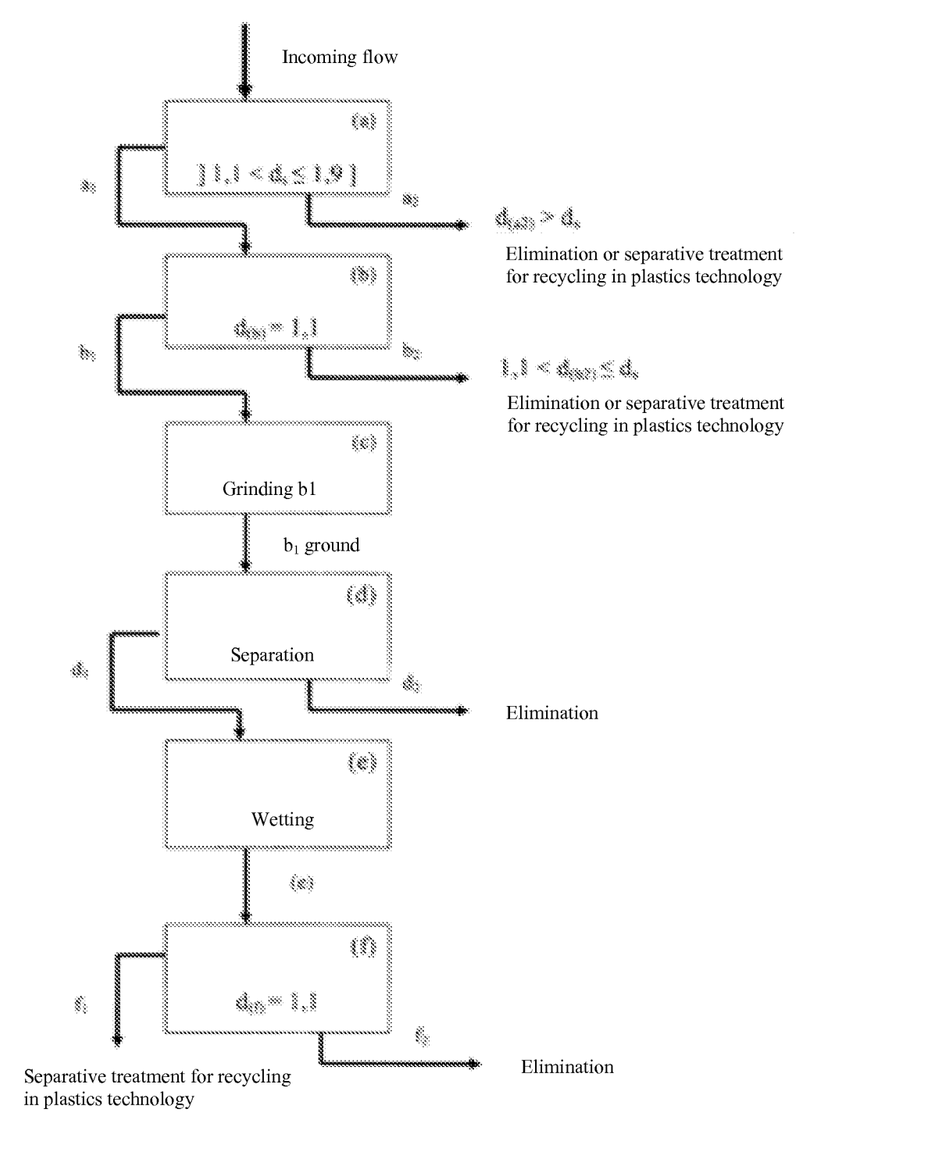
FIG. 1 depicts an embodiment of the present invention.

(According to FIG. 1)

The method of simultaneous preconcentration and preselection of at least one group of polymer materials by processing a mixture of fragmented materials issuing from residues from grinding objects at the end of their life, such as for example automobiles, domestic electrical appliances, electronic materials and a mixture formed from fractions of materials as diverse as polymer materials, metals, mineral materials and materials of organic origin other than the polymer materials mentioned above, excluding expanded polymer materials, concerns all the polymer and/or copolymer materials that it is sought to upgrade, of thermoplastic and thermosetting types, in particular, polar or non-polar, with or without fillers, flame retarded or not, with adjuvants or not, which are present in the aforementioned consumable objects, which have arrived at the end of their life and can be recycled in the fields of plastics technology.

The method for the simultaneous preconcentration and preselection of at least one group of used polymer materials of the mixture of aforementioned miscellaneous materials issuing from grinding residues consists of processing said mixture in order to eliminate therefrom at least partially the non-upgradable contaminating materials formed by fractions of materials other than the polymers to be upgraded and simultaneously preselecting at least one group of said upgradable materials. This elimination thus allows enrichment of said mixture of upgradable polymer materials by increasing their concentration and this simultaneous preselection makes it possible to create at least one group of used polymer materials to be upgraded, each group being delimited by a density range defined by $[d_{min}\text{-}d_{max}]$, which is particular to it.

Once preconcentrated by at least partial elimination of the non-upgradable contaminating fractions and preselected in at least one group of upgradable used polymers, the mixture enriched with preselected upgradable polymer materials can be processed by appropriate means outside the field of the subject matter of the invention.

As manifested, the method for the simultaneous preconcentration and preselection of at least one group of upgradable used polymer materials comprises, concatenated in the following order, a step (a) of hydraulic separation in a medium of density "$d_s$" chosen from the density range [1.100-1.900] (lower bound excluded) giving a supernatant fraction (a1) and a setting fraction (a2), and then a step (b) of hydraulic separation of the supernatant fraction (a1) coming from step (a) at a density of 1.100 given a supernatant fraction (b1) with a density of no more than 1.100 and a settling fraction (b2) with a density lying in the range $[1.100\text{-}d_s]$, a grinding step (c), the end of the supernatant fraction (b1), a step (d) of mechanical separation by aeraulic screening giving a fraction of upgradable materials (d1), a step (e) of wetting the fraction (d1) and finally a step (f) of hydraulic separation in a medium of density 1.100, giving a supernatant fraction (f1) forming a preconcentrated and preselected group of used polymer materials to be upgraded, the densities of which are situated in the limits [0.850-1.100].

concerning the supernatant fraction (a1) of step (a), the density of which lies in the range [0.850-$d_s$], this fraction systematically concatenates steps (b), (c), (d), (e) and (f), by processing the supernatant fractions (b1), (d1) and (f1);

This fraction (a1) gives a mixture of "n" groups of separable homogeneous polymer materials, each group having a density [$d_{min(n)}$-$d_{max(n)}$], "n" taking integer values lying between 1 and the number of types of polymer material to be recovered.

concerning the settling fraction (a2) of step (a) the densities of which lie in the range [$d_s$-1.900], it can be definitively illuminated according to the value initially taken by $d_s$ in step (a) or it undergoes, independently of the fraction (a1), an upgrading treatment by steps, for example hydraulic separation by density in order to collect the upgradable used polymer materials present in said fraction the densities of which lie in the range [$d_s$-1.900]; according to the groups of density [$d_{min(n)}$-$d_{max(n)}$], "n" taking integer values lying between n and the number of types of polymer material to be recovered, concerning the settling fraction (b2) of step (b), the densities of which lie in the range [1.1-$d_s$], this may be definitively eliminated or may undergo, independently of the fraction (b1), an upgrading treatment by hydraulic separation steps by density in order to collect the upgradable used polymer materials present in said fraction and the densities of which lie in the range [1.1-$d_s$], according to groups of density [$d_{min(n)}$-$d_{max(n)}$], "n" taking integer values lying between 1 and the number of types of polymer material to be recovered.

Preferentially, the choice of the density $d_s$ given to the hydraulic separation medium of step (a) is made in the range of [1.100-1.500].

Thus, according to the method of the invention, it is possible to preconcentrate and extract at least one selected group formed by upgradable polymer materials in the form of a mixture of fragmented polymer materials the grouping criterion of which is the density range "$d_{min}$-$d_{max}$" chosen for a group, this group formed from a mixture of used polymers still containing fractions of contaminating materials that will be subsequently eliminated.

According to this same method of the invention, it is also possible to extract the fraction of expanded polymers, in particular the one formed by open-cell foams, constituting one of the nuisance contaminants.

Step a) of the Method According to the Invention

According to the method for processing a mixture of materials that is the subject matter of the invention, step a) receives all the flow of various fragmented materials in the form of a mixture coming from the grinding residues of objects at the end of their life as previously defined. This step a) of the method according to the invention is a step of separation by density in a water medium the density of which is adjusted to a value "$d_s$" chosen from a density range [$d_{min}$-$d_{max}$] that is the criterion for assembling said used polymer materials in a group, each group formed having its own density range [$d_{min}$, $d_{max}$] that characterises it.

Consequently $d_s$ is chosen in the density range defined according to the invention which (lower bound excluded) lies between 1.100 and 1.900.

The density value chosen $d_s$ for the hydraulic separation medium of step (a) then constitutes the upper bound of the range [$d_{min}$-$d_{max}$] of a first group of upgradable used polymer materials to preselected, $d_s$ then being merged in the value $d_{max}$ of said group while the lower bound $d_{min}$ is chosen between [0.850 and $d_s$] in order to provide this preselection, depending on the importance given to the density range of this first group. This first group of upgradable used polymer materials to be preselected and preconcentrated forms the supernatant fraction (a1) of maximum density $d_s$.

In a particular case, for example where the simultaneous implementation of the preconcentration of upgradable used polymer materials present in the mixture and the preselection of two groups, each of which is identified by precise density limits [$d_{min}$-$d_{max}$] for each group, is desired, the density $d_s$ of the hydraulic separation medium is chosen equal to 1.100 (in industrial practice), thus making it possible to preselect a group of density ranges ranging from $d_{min(1)}$=0.850 to $d_{max(1)}$=1.100 (lower bound excluded) and another group of densities ranging from $d_{min(2)}$=1.100 to $d_{max(2)}$=1.900 (lower bound excluded).

Thus a first group of density limits lying between $d_{min(1)}$ and $d_{max(1)}$ (lower bound excluded) comprises, for example, all the polystyrene without filler (PS: 1.05), polypropylene (PP: 0.900-0.910), low-density polyethylene (LDPE: 0.91-0.94), high-density polyethylene (HDPE: 0.94-0.96), polyethylene foams, polypropylene foams, some of the polyamides (PA: 1.02 to 1.15), with or without filler, a major part of ABSs (approximately 66% ABS: 1.06 to 1.12), all the polypropylene with 10% talc filler (PP: 10% talc: 0.97), polypropylene with 20% talc filler (PP: 20% talc: 1.04), copolymers.

The other group of density limits $d_{min(2)}$-$d_{max(2)}$ (lower bound excluded) comprises, for example, the rest of the polyamides (1.13-1.15), the rest of the ABSs, all the aminoplasts (1.4), polycarbonate (1.20), amorphous and crystalline PETs (1.30-1.40), phenoplasts (1.25-1.40), plasticised PVCs (1.20-1.35), rigid PVCs (1.38-1.40), PVCs with fillers (1.4-1.7), PP with 30% talc filler (1.13) and 40% talc filler (1.24), copolymers.

Each of the preconcentrated and preselected groups in mixtures of fragmented polymer materials still contains fractions of contaminating materials subsequently eliminated during the processing of each group in order to extract therefrom, by selective separation, each upgradable used polymer material.

In another particular case, for example, where the simultaneous implementation of the preconcentration with upgradable used polymer materials present in the mixture and the preselection of three groups is desired, each of the latter being identified by precise density limits $d_{min}$-$d_{max}$ for each group, the density $d_s$ of the hydraulic separation medium is chosen, for example, to be equal to 1.250 allowing preconcentration and preselection of a first group of density limits ranging from $d_{min(1)}$=0.850 (lower bound excluded) to $d_{max(1)}$=1.100, a second group of density limits ranging from $d_{min(2)}$=1.100 (lower bound excluded) to $d_{max(2)}$=1.250 and a third group of density limits ranging from $d_{min(3)}$=1.250 (lower bound excluded) to $d_{max(3)}$=1.900.

In another particular case, for example, where the simultaneous implementation of the preconcentration with upgradable used polymer materials present in the mixture and the preselection of three groups is desired, each of the latter being identified by density limits $d_{min}$-$d_{max}$ for each group, the density $d_s$ of the hydraulic separation medium is chosen, for example, to be equal to 1.350 allowing preconcentration and preselection of a first group of density limits ranging from $d_{min(1)}$=0.850 (lower bound excluded) to $d_{max(1)}$=1.100, a second group of density limits ranging from $d_{min(2)}$=1.100 (lower bound excluded) to $d_{max(2)}$=1.250, a third group of density limits ranging from $d_{min(3)}$=1.350 (lower bound excluded) to $d_{max(3)}$=1.250 and a fourth group of density limits ranging from $d_{min(4)}$=1.350 (lower bound excluded) to $d_{max(4)}$=1.900.

In general terms, the choice of the value of d, between 1.100 and 1.900 (lower bound excluded) is made according to the upgradable used polymer groups, in a mixture, to be created by preselection according to the density limits $d_{min(n)}$-$d_{max(n)}$ for each group and simultaneously to be preconcentrated, according to the types of recycling polymer material required by the users, that is to say by the markets.

The hydraulic separation medium, of density d, chosen as the separation threshold according to the invention in a density range, bounds included, lying in the range [1.1-1.9], is formed by water and water-soluble mineral compounds, such as mineral salts (preferentially sodium, potassium and magnesium salts), and/or mineral compounds insoluble or only slightly soluble in water, with a very small granulometric dimension, such as clays, calcium carbonate, or powder put in suspension in water in an exactly controlled quantity to exactly reach the value chosen as the separation threshold for the density $d_s$.

Preferentially, the granulometric curve of the particles of the insoluble or very slightly soluble mineral compounds, which concerns 100% of the particles of said compounds, is no more than 5 µm, which means that all these particles have an equivalent diameter lying in the range [0 µm-5 µm], the lower bound being excluded.

Preferentially, the median diameter of the particles of the insoluble or only slightly soluble mineral compounds lies in the range [0 µm-1 µm], the lower bound being excluded.

The settling fraction (a2) resulting from the first hydraulic separation step (a), which contains at least partly the fraction of the contaminating materials of the mixture of fragmented materials, may contain a fraction of used polymer materials to be upgraded, which is all the greater quantitatively when the value chosen for $d_s$ is close to 1.1.

Step b) of the Method According to the Invention

This step consists of the separation of the supernatant fraction (a1) coming from step a) in a water medium the density of which is exactly adjusted to the value of 1.1.

This fraction (a1) gives a supernatant fraction (b1) with a density of no more than 1.1 formed by ultra-light and/or expanded used synthetic polymer materials, used synthetic polymer materials to be upgraded in a fragmented form as well as contaminating materials and a settling fraction (2) with a density lying in the range [1.1-$d_s$] containing upgradable used polymer materials and heavy contaminating materials.

The hydraulic separation medium of step b) is formed by the same means as those used in the preparation of the water medium of step a).

Step c) of the Method According to the Invention

The fraction (b1) of the polymer materials to be upgraded with a density of no more than 1.1 coming from the separation step b) in a water medium of the method according to the invention, which contains contaminating materials, included with, adhering to or assembled with the used polymer materials to be upgraded, is introduced in step c) of the method according to the invention. This step c) consists of a fine grinding of said fraction (b1) to be upgraded in order to achieve at least the mesh releasing the contaminating materials included in the used polymer materials to be upgraded in order to free said upgradable polymer materials of all the contaminating materials, adhering, assembled or included. This grinding step, with at least the mesh releasing the contaminating materials, leads to the implementation and the obtaining of a necessary fine fragmentation giving polymer particles to be upgraded having their largest dimensions generally lying between 5 and 50 mm and preferentially between 20 mm and 30 mm.

The fraction (b2) of polymer materials to be upgraded, with a density of between 1.1 (lower bound excluded) and $d_s$, undergoes, separately from the fraction (b1), a fine grinding treatment in step c), equivalent to that undergone by the fraction (b1) with the same grinding means in order to arrive at the results of separation of the used polymer materials to be upgraded and the adhering, assembled or included contaminating materials and of sizing of the used polymer particles to be upgraded.

The grinding of step c) of the method according to the invention can take place continuously in suitable grinders, known to persons skilled in the art.

Step d) of the Method According to the Invention

At the discharge from the fine grinding step c) the flow (b1) of materials ground at (c) formed from upgradable polymer materials and contaminating materials released by the grinding and which must be eliminated, enters a step d) of mechanical separation by screening and/or aeraulic separation by gaseous flow. However, though the release by grinding of the rigid contaminating materials does not create a tricky subsequent separation situation, the same does not apply to the flexible materials, in particular polymer foams which, during grinding, are subjected to a compression phenomenon, that is to say a reduction in volume. At the discharge from the fine grinding step c), the particles of compressed foams have a tendency to resume their initial volume through repose, and as soon as they are released adopt a shape factor different from that of the upgradable rigid materials that are the finely ground polymer fragments.

In addition, the flows of finely ground materials coming from step c) of the method according the invention may manifest a variable dryness state which, depending on whether the flow of materials coming from step c) is rather dry or moist, may have an effect on the final step d) of the method according to the invention, the threshold value of the threshold moisture level between the dry state and the moist state being no more than 20% by weight.

In the case where the flow of finely ground materials coming from step c) is relatively dry, the separation of the various ultra-light, light and heavy fractions of this flow may be of the aeraulic type and may be done by aspiration and/or blowing in an aeraulic separation zone comprising at least one aeraulic separation means functioning by blowing and/or aspiration of a gaseous flow, this zone having an entry for the mixture of materials to be separated and three outlets for extracting a fraction of ultra-light and/or expanded polymer materials to be eliminated, a fraction consisting of contaminating heavy materials to be eliminated and a fraction formed by polymer materials to be upgraded. The latter fraction constitutes the flow of preconcentrated and preselected upgradable materials resulting from the method according to the invention, preferentially containing approximately at least 85% by weight upgradable materials and no more than 15% by weight contaminating materials.

In the case where the aeraulic separation zone of step d) of the method according to the invention comprises a single aeraulic separation means, this separation means itself comprises at least two specific zones for separating the materials to be separated. One of the specific aeraulic separation zones is the zone that simultaneously feeds materials to be separated, the incoming flow of which is subjected, during its introduction into said zone, to an early aeraulic separation and to an immediate discharge from the separation means by gaseous flow of the fraction of ultra-light materials to be eliminated. The other specific aeraulic separation zone, provided with a screening surface and also subjected to a gaseous flow, treats the mixture of fractions of the heavy and contaminating materials and the upgradable materials coming from the first specific zone, the gaseous flow separating and entraining to a discharge from the aeraulic separator the fraction of upgradable materials, while the fraction of contaminating heavy materials is separated from the upgradable fraction by gravity and is eliminated from the aeraulic separation means through a suitable outlet. Such an aeraulic separation means or aeraulic separator with two specific separation zones may be chosen from the group consisting of modular separators/cleaners/calibrators comprising screens and a double aspiration: an aeraulic separator of this type is marketed for example by the company Westrup.

In the case where the aeraulic separation zone of step d) of the method according to the invention is composed of two aeraulic separation means, said separation means are consequently mounted in series so that a discharge at least of the fractions of ultra-light and/or expanded and heavy contaminating materials is situated on the first aeraulic separation means.

According to a variant relating to the presence of two means of aeraulic separation by gaseous flow in the aeraulic separation zone, the first aeraulic separation means that receives the incoming flow of materials to be separated into fractions of contaminating and upgradable materials coming from step c) treats this flow in two fractions, so that the fraction of ultra-light materials is extracted by the top part of the first aeraulic separation means while a mixture of the fractions of contaminating heavy materials and materials to be upgraded is extracted by the bottom part of said aeraulic separation means. This mixture of fractions of contaminating heavy materials and materials to be upgraded is introduced into the second aeraulic separation means, the fraction of contaminating heavy materials being eliminated by the bottom part of the second aeraulic separation means while the fraction of materials to be upgraded is extracted from step d) and may also undergo an additional step of elimination of contaminating materials.

According to another variant relating to the presence of two aeraulic separation means with gaseous flow in the aeraulic separation zone, the first separation means that receives the incoming flow of materials to be separated into fractions of contaminating and upgradable materials coming from step c) treats the flow in two fractions so that the fraction of contaminating heavy materials is extracted by the bottom part of said aeraulic separation means while a mixture of the fractions of contaminating ultra-light materials and upgradable materials is extracted by the top part of the first aeraulic separation means. This mixture of the fractions of contaminating ultra-light materials and upgradable materials is introduced into the second aeraulic separation means, the fraction of contaminating ultra-light materials being eliminated by the top part of the second aeraulic separation means while the fraction of upgradable materials is extracted by the bottom part of said separation means.

Whether use is made of one or several aeraulic separation means, in step d) of the method according to the invention, the fraction of contaminating ultra-light materials extracted from the aeraulic separation zone may be subjected to an additional step of separation by screening according to their largest dimension and/or their shape factor in order to effect the separation of a fraction formed from materials with dimensions less than those of the mesh of the screen such as polymer powders, thread and/or film and/or fabric waste, or small volumes of foams, and to recover all the flakes of foams that cannot pass through the meshes of the sieve and upgrade them by means of a suitable operation such as glycolysis, mechanical agglomeration with the addition of a binder, or cryogenic grinding in order to produce organic fillers intended to be introduced into articles produced by means of thermoplastic or thermosetting polymers.

In the case where the flow of finely ground materials coming from step c) is relatively moist, that is to say containing more than 20% by weight of water, the mechanical separation by dimensional screening and/or by shape factor may be effected by means of a device comprising a screening means such as a grille with a calibrated separation mesh, adapted to the materials the separation of which is sought and more particularly to the shape of the upgradable fragments.

A screening means adapted to the performance of the separation step may be chosen from the devices provided with a rotary drum with calibrated meshes or provided with a vibrating grille with calibrated meshes or any other device provided with a calibrated separation means: the largest dimension of the calibrated mesh is generally no more than 30 mm and preferentially between 1 mm and 10 mm.

When step d) is performed, a mechanical separation by calibrated screening may be done by means of a device with calibrated meshes such as with a vibrating grille or a cylindrical separation surface such as a rotating trommel, with a slightly inclined axis of rotation, the calibrated mesh of the surface intended for the separation being formed by bars arranged along generatrices and bearing on circular structures coaxial with the rotation axis of said surface: the calibrated mesh is defined by the free space delimited by two bars and two contiguous circular structures so that:

only the upgradable polymer fractions in the form of platelets pass through this free space while entraining the minimum of contaminating materials the largest dimension of which is less than the distance between two bars, these contaminating materials being foams, pieces of wood and the like, the fractions of contaminating materials with a shape factor different from that of the upgradable polymer fractions or where the largest dimension is at least equal to the distance between two bars, are retained by the sorting mesh formed by the bars and the annular structures previously mentioned: these contaminating materials thus eliminated are essentially foams, wood waste, alveolar rubber and other materials.

This step of mechanical separation by screening and/or shape factor allows the elimination of a large fraction of the polymer foams and other contaminating materials such as films and polymer threads, or pieces of wood at least partly.

At the end of this mechanical separation by screening and/or aeraulic separation (d), the fraction (b1) of preconcentrated and preselected upgradable polymer materials extracted from step (d) enters step (e) of the method according to the invention.

The fraction (b2) with a density of between 1.1 and $d_s$ (lower bound excluded) coming from step (b), containing upgradable used polymer materials and contaminating materials that constitutes another group of preconcentrated and preselected upgradable used polymers to be upgraded, may undergo the same fine grinding of step (c) as the fraction (b1) and then, at the discharge from step (c), the same treatment of separation of upgradable polymer materials and contaminating materials released by the grinding, in step (d) of mechanical separation by screening and/or aeraulic separation, it being understood that this fraction (b2) free from ultra-light and/or expanded polymer materials to be eliminated is preferentially treated by a mechanical separation by screening.

At the end of this mechanical separation by screening and/or aeraulic separation (d), the fraction (b2) of preconcentrated and preselected upgradable polymer materials extracted from step (d) may pass to step (e) of the method according to the invention or directly enter step (f) because of the density range 1.1 to $d_s$ of said materials.

Step e) of the Method According to the Invention

The flow (b1) of materials of density $d_{(b)}1 \leq 1.1$, after grinding in step (c) and mechanical and/or aeraulic separation in step (d), which removed from them polymer foams and at least partly other contaminating materials, is subjected in step (e) to a wetting by means of water, by spraying or immersion in baths, strongly stirred or not, or by any other means, with a view to increasing the density of the "wood" contaminant and being able to eliminate it in the following step (f).

The flow (b2) of the materials of density $d_{(b2)}$ lying in the range [$1.100$-$d_s$] after grinding in step (c) and mechanical or aeraulic separation in step (d), may be subjected to the wetting step (e) but may optionally pass directly from step (d) to step (f) in which said flow is freed from the presence of the "wood" contaminant.

Step f) of the Method According to the Invention

Step (f) receives all the flow of materials coming from step (e).

This step (f) of the method according to the invention is a step of separation by density in a water environment the density of which is adjusted to the value of 1.100 providing the separation of a supernatant fraction (f1) containing preconcentrated and preselected polymer materials and contaminating materials the densities of which lie in the range [$0.850 < d_{(f)}1 \leq 1.100$] and settling fraction (f2) containing the densified "wood" contaminant.

At the end of this separation step (f) in a water medium, the fraction of the upgradable polymer materials (f) extracted from the processing method according to the invention constitute a preconcentrated and preselected fraction of upgradable materials preferentially attaining at least 85% by weight recycled synthetic polymers to be upgraded.

The method according to the invention is used to effect, simultaneously in a mixture of materials resulting from the destruction by grinding of durable consumer goods at the end of their life, a preconcentration and preselection of used polymer materials upgradable by recycling.

The method for the simultaneous preconcentration and preselection according to the invention of at least one group of used polymer materials, of various compositions, in a mixture together and with contaminating materials, is absolutely suited to all systems for the destruction by grinding of durable consumer goods that have arrived at the end of their life such as for example automobiles, domestic electrical equipment and computer equipment.

Finally, the method according to the invention can be used first for the preconcentration and preselection of used polymer materials to be recycled in the fields of plastics technology, but also for supplying very selective separation methods leading to the extraction of flows of recyclable materials, made homogeneous by their composition.

The invention will be better understood by means of an example cited by way of illustration and the representative diagram (according to the FIGURE) of the simultaneous preconcentration and preselection of recyclable used polymers.

EXAMPLE

According to the FIGURE

A fragmented incoming flow of a grinding residue of an automobile at the end of its life, the ferrous metal parts of which have previously been removed, is processed according to the method of the invention.

This flow supplying the method of the invention, the flow rate of which is 20 tonnes/hour contains polymer materials, sandy mixtures, non-ferrous metals and wood, which is screened with a mesh of 10/12 mm and subjected to aspiration in order to eliminate the very light materials such as foams and sandy minerals.

This flow constitutes the incoming flow in the method according to the invention.

According to step a) of the method, the feed flow enters a hydraulic separation medium, the density $d_s$ of which is adjusted to 1.400. This density $d_s=1.400$ constitutes the upper density limit "$d_{max}$" chosen for a group of upgradable used polymers comprising polyolefins, some of which have a talc filler, polystyrene, ABSs, polyamides, PVCs and other polymers and copolymers and contaminating materials.

The supernatant fraction (a1) of maximum density 1.400 is formed from polyolefins with fillers or not (PP, LDPE, HDPE), polystyrene (PS), ABS, polyamides (PA), aminoplasts, polycarbonate (PC), amorphous and crystalline PETs, phenoplasts, plasticised PVCs and rigid PVCs, ethylene vinyl acetate (EVA), ethylene-propylene copolymers, ethylene-propylene rubber (EPR), ethylene-propylene-diene monomer (EPDM), polymethyl methacrylates (PMMAs) of d=1.18, polyurethanes (PU) with filler or not. This supernatant fraction (a1) represents a mass of around 8 tonnes/hour.

The settling fraction (a2) of density greater than 1.400 also contains polymer materials, including mainly PVCs with fillers and contaminating materials to be eliminated. Once collected this settling fraction (a2) may undergo a separation treatment for recovering polymer materials present in this fraction, that is to say PVC with filler. This settling fraction (a2) represents a mass of around 12 tonnes/hour.

According to Step (b) of the Method:

The supernatant fraction (a1) coming from step (a) enters this separation step (b), where it is treated by means of a hydraulic separation medium with a density adjusted to 1.100, giving a supernatant fraction (b1) with a density of no more than 1.100 and a settling fraction (b2) with a density of [1.100-1.400].

The supernatant fraction (b1) contains polypropylene (PP: d=0.900-0.910), low-density polyethylene (LDPE: d=0.910-0.940), high-density polyethylene (HDPE: d=0.940-0.960), polystyrene (PE: 1.040), some of the polyamides (1.040 to 1.150), for the fraction ranging up to the density 1.100 of some of the ABSs (1.060 to 1.120), for the fraction ranging up to the density 1.100 of the whole of the polypropylene with 10% talc filler (PP: 10% talc:0.970) and of the whole of the polypropylene with 20% talc filler (PP: 20% talc: 1.040). This supernatant fraction represents a mass of around 4 tonnes/hour.

The settling fraction (b2) with a density lying between [1.100-1.400] also contains upgradable used polymer materials that are mainly the remainder of the polyamides (PA: 1.040-1.150) for the fraction with a density greater than 1.100, the remainder of the ABSs (d: 1.06 to 1.12) having a density greater than 1.100, all the aminoplasts (1.40), polycarbonate (1.20), amorphous and crystalline PETs (1.300 to 1.400), phenoplasts (1.25-1.40), plasticised PVCs (1.20-1.35), rigid PVCs (1.38-1.40), polypropylenes with talc filler at 30% (1.13) and 40% (1.24) and contaminating materials to be eliminated. Once collected, this settling fraction (b2) may undergo a separation treatment for recovering the upgradable used polymer materials present in this fraction in order to obtain as many flows with a homogeneous composition as there are types of upgradable polymer materials present. This settling fraction (b2) represents a mass of around 4 tonnes/hour.

According to step (c) of the method: the supernatant fraction (b1) coming from step (b) enters this grinding step (c) in order to reach at least the mesh releasing the contaminating materials included in the used polymer materials to be upgraded or assembled with or adhering to said materials. The release mesh formed with regard to the fraction (b1) was from 20 mm to 30 mm.

According to step (d) of the method: the fraction (b1) emerging from the grinding step (c) after having been fragmented at the release mesh between this mechanical separation step, where it undergoes first an aeraulic separation for eliminating a fraction formed from light materials with a dimension less than that of the release mesh formed during the grinding step making it possible to eliminate polymer powders, thread, film and fabric waste, flakes of polymer foam and the like, and then screening to a shape factor, according to the largest dimension of the upgradable rigid materials formed by the used polymer fragments ground to the aforementioned release mesh ensuring the separation of said fragments of upgradable polymer materials forming a fraction (d1) to be collected, rich in polymer materials and contaminating materials to be eliminated formed by polymer foams, wood waste, alveolar rubber and the like.

The fraction (d1) collected after screening by shape-factor sorting, rich in upgradable used polymer materials, represents a mass of around 5 tonnes/hour.

The collected fraction (d2) that comprises in a mixture the light materials eliminated by aeraulic separation and the contaminating materials with shape factor different from that of the upgradable polymer fractions eliminated during screening, by shape factor, is eliminated at the exit from step (d): this fraction (d2) represents a mass of around 0.5 tonnes/hour.

According to step (e) of the method: the fraction (d1) collected at the exit from step (d) is subjected in this step to wetting by means of water in order to increase the density of the "wood" contaminant still present in said fraction (d1) and to be able to eliminate it in the final step (f) of the method.

According to step (f) of the method: The whole of the fraction (d1) emerging from step (e) enters this step (f), where it is treated by means of a hydraulic separation medium with a density adjusted to 1.100 giving a supernatant fraction (f1) with a density of no more than 1.100, very rich in recyclable used polymer materials the densities of which lie in the range [0.850-1.100] and a settling fraction (f2) containing the remainders of the densified "wood" contaminant, which is eliminated. The fraction (f1) represents a mass of around 4 tonnes/hour.

Consequently, according to the method of the invention, at the end of these separations, it was possible to form three groups of used polymer materials of various compositions in a mixture with each other and with contaminants by simultaneous preconcentration and preselection, coming from the destruction by grinding of durable consumer goods that have arrived at the end of their life, recyclable in the fields of plastics technology.

The first preconcentrated and preselected group is formed by the settling fraction (a2) where the densities of the upgradable components are greater than 1.400 and the essential components are upgradable PVCs with fillers.

The second preconcentrated and preselected group is formed by the settling fraction (b2) where the densities of the upgradable components lie in the range [1.100-1.400] and the essential components are polyamides, ABSs, aminoplasts, polycarbonates, amorphous and crystalline PETs, plasticised and rigid PVCs, and polypropylenes with talc filler (30%-40%).

The third preconcentrated and preselected group is formed by the supernatant fraction (f1) where the densities of the upgradable components lie in the range [0.850-1.100] and the essential components are polypropylenes, polyethylenes, polystyrenes, polyamides, ABSs and polyolefins with fillers.

Each of the polymer components of each group can be extracted from its group, according to the fractions of recyclable used polymers homogeneous in composition by the treatment of these groups by means of a selective separation method such as for example the one described in European patent N° 0 918 606.

Thus, by virtue of the method according to the invention, it is possible to simultaneously preconcentrate and preselect at least one group of upgradable used polymer materials of various compositions, in a mixture with each other and with contaminating materials, coming from the destruction by grinding of durable consumer goods that have arrived at the end of their life, recyclable in the fields of plastics technology.

The invention claimed is:

1. A method of treating a mixture of fragmented materials, wherein the mixture of fragmented materials comprises upgradable used polymer materials in small quantities recyclable in the fields of plastics technology and contaminating materials issuing from the grinding of durable consumer goods at the end of their life,
(ii) wherein said method comprises a) to f), in the following order:
a) separation in a water medium the density of which is adjusted to a value $d_s$ chosen in a density range, lower bound excluded, lying in 1.100- 1.900, $d_s$ constituting the upper density limit $d_{max}$ chosen for a group of upgradable used polymers to be preselected, whereas the lower density limit $d_{min}$ of said group lies from 0.850 to $d_s$, a water medium in which the mixture of used polymer materials to be upgraded, forming a group of upgradable polymers with densities greater than $d_s$, preconcentrated and preselected, and contaminating materials in introduced, which is separated into a supernatant fraction (a1) of maximum density $d_s$ and a settling fraction (a2), containing used polymer materials to be upgraded and at least partly the fraction of contaminating materials of the mixture of fragmented materials with a density greater than $d_s$, extracted from the method,
b) separating the supernatant fraction (a1) coming from step a) in a water medium the density of which is adjusted to a value of 1.100 giving a supernatant fraction (b1) with a density of no more than 1.100, which comprises a fraction of ultra-light and/or expanded used synthetic polymer materials and used synthetic polymer materials to be upgraded in a fragmented form as well as contaminating materials and a settling fraction (b2) with a density lying from 1.100 to $d_s$ containing upgradable used polymer materials and heavy contaminating materials, constituting another group of preconcentrated and preselected upgradable used polymers, extracted from the method to be upgraded,
c) grinding the fraction (b1) of polymer materials to be upgraded coming from step b), at the mesh releasing the contaminating materials, included in, adhering to or assembled with the fragments of the fraction of polymer materials to be upgraded,
d) mechanical separation by a dimensional screening and/or by shape factor or aeraulic, of the fraction of synthetic polymer materials to be upgraded coming from the grinding step c) in order to eliminate therefrom at least partly the fraction (d2) of contaminating materials released during the grinding and the expanded polymer materials and extract therefrom the fraction (d1) of the upgradable materials constituting the required mixture, preconcentrated and preselected according to a group of upgradable materials, delimited by the densities $d_{min}$ =0.850 lower bound excluded and $d_{max}$ =1.100 still containing contaminants, e) wetting the fraction coming from step d) by means of water with a view to increasing the density of wood contaminant present, and f) separating the fraction coming from step e) in a water medium the density of which is adjusted to the value 1.100, giving a supernatant fraction (f1) of used synthetic polymer materials to be upgraded, forming a preconcentrated and preselected group of upgradable used synthetic polymer materials delimited by the densities $d_{min}$ =0.850, (lower bound excluded) and $d_{max}$ =1.100 constituting a raw material for a method of fine separation of the polymers present according to composition thereof with a view to recycling thereof and a settling fraction (f2) containing mainly the wood contaminant.

2. A method according to claim 1, wherein the fraction (a1) of maximum density $d_s$ is formed from a mixture of n groups of separable homogeneous polymer materials, each group having an inherent density, n taking integer values lying from 1 to a number of types of polymer to be recovered.

3. A method of according to claim 1, wherein the settling fraction (a2) of step a) the densities of which lie in the range $d_s$-1.900 is eliminated.

4. A method according to claim 1, wherein the settling fraction (a2) at step (a) undergoes, independently of the fraction (a1), an upgrading treatment by separation by density in order to collect upgradable used polymer materials present in said fraction the densities of which lie in the range $d_s$-1.900, according to groups of density, n taking integer values lying from 1 to a number of types of polymer to be recovered.

5. A method according to claim 1 wherein, the settling fraction (b2) of step (b) the densities of which are situated in the range 1.1-$d_s$ is eliminated.

6. A method according to claim 1 wherein, the settling fraction (b2) undergoes, independently of the fraction (b1), an upgrading treatment by separation by density in order to collect upgradable used polymer materials present in said fraction the densities of which are in the range 1.1-$d_s$, according to groups of density $d_{min(n)}$- $d_{max(n)}$, n taking integer values lying from 1 to a number of types of polymer to be recovered.

7. A method according to claim 1 wherein the density $d_s$ given to the hydraulic separation medium of step (a) is chosen in the range 1.100-1.500.

8. A method according to claim 1 wherein the hydraulic separation medium with density $d_s$ chosen as the separation threshold in a density range lying in 1.1-1.9 is formed by water and water-soluble mineral compounds and/or mineral compounds that are insoluble or only slightly soluble in water, with a very small granulometric dimension, put in suspension in exactly controlled quantities to exactly achieve the value chosen as the separation threshold for the density $d_s$.

9. A method according to claim 8, wherein the soluble mineral compounds are used and are sodium, potassium or magnesium salts.

10. A method according to claim 8, wherein the mineral compounds that are insoluble or only slightly soluble in water are used and are powdery clays or powdery calcium carbonate.

11. A method according to claim 8, wherein the particles of the insoluble or only slightly soluble mineral are used and wherein a granulometric curve of the compounds lies in the range 0 μm-5 μm.

12. A method according to claim 8, wherein the insoluble or very slightly soluble mineral compounds are used and have a median diameter of particles is in the range 0 μm-1 82 m.

13. A method according to claim 1, wherein the mesh releasing the contaminating materials by fine fragmentation is chosen so as to give particles of polymers to be upgraded having their largest dimensions from 5 to 50 mm.

14. A method according to claim 1, wherein mechanical separation by screening and/or shape factor is done according to a screening mesh the largest dimension of which is not more than 30 mm.

15. A method according to claim 14, wherein mechanical separation by screening and/or shape factor is done in a device with calibrated separation meshes chosen from the group formed by a vibrating-grille device or a device with a cylindrical separation surface in rotation, with a slightly inclined rotation axis.

16. A method according to claim 1, wherein aeraulic separation takes place by aspiration and/or blowing in a separation zone comprising a single aeraulic separation means, said separation comprising at least two specific zones for separating the materials to be separated, the first of the specific aeraulic separation zones being the zone that simultaneously allows supply of materials to be separated the incoming flow of which is subjected during its introduction into said zone to an early aeraulic separation and to an immediate discharge from the separation means by the gaseous flow of the fraction of ultra-light materials to be eliminated, another specific aeraulic separation zone, provided with a screening surface and also subjected to a gaseous flow, treating the mixture of the fractions of heavy and contaminating materials and the upgradable materials coming from the first specific zone, the gaseous flow separating the fraction of upgradable materials and entraining it to an exit from the aeraulic separator, while the fraction of contaminating heavy materials is separated from the upgradable fraction by gravity and is eliminated from the aeraulic separation means through an appropriate exit.

17. A method according to claim 16, wherein aeraulic separation means with two specific separation zones is chosen from the group consisting of modular separators/cleaners/calibrators comprising screens and a double suction.

18. A method according to claim 1, wherein the upgradable materials coming from step c) are subjected to an aeraulic separation, by suction or blowing in two aeraulic separation means mounted in series.

19. A method according to claim 18, wherein the first aeraulic separation means receives the incoming flow of materials to be separated into fractions of contaminating and upgradable materials coming from step c), processes this flow in two fractions, so that the fraction of ultra-light materials is extracted by the top part of the first aeraulic separating means, while a mixture of the fractions of contaminating heavy materials and materials to be upgraded is extracted by the bottom part of said aeraulic separation means and said mixture is introduced into the second aeraulic separation means, the fraction of contaminating heavy materials being eliminated by the bottom part of the second aeraulic separation means while the fraction of materials to be upgraded is extracted from step d).

20. A method according to claim 18, wherein the first aeraulic separation means receives the incoming flow of materials to be separated into fractions of contaminating and upgradable materials coming from step c), treats the flow in two fractions so that the fraction of contaminating heavy materials is extracted by the bottom part of said aeraulic separation means while a mixture of the fractions of contaminating ultra-light materials and upgradable materials is extracted by the top part of the first aeraulic separation means. Said mixture is introduced into the second aeraulic separation means, the fraction of contaminating ultra-light materials being eliminated by the top part of the second aeraulic separation means while the fraction of upgradable materials is extracted by the bottom part of said aeraulic separation means.

21. A method according to claim 1, wherein the fraction of the contaminating ultra-light materials extracted from the aeraulic separation zone is subjected to an additional step of separation by screening according to their largest dimension and/or their shape factor in order to achieve separation of a fraction formed from materials with dimensions less than those of the mesh of the screen optionally comprising one or more polymer powders, thread and/or film and/or fabric waste, or small volumes of foams, and to recover all the flakes of foams that cannot pass through the meshes of the screen and to upgrade them by a suitable operation.

* * * * *